US009826164B2

(12) United States Patent
Pryszo et al.

(10) Patent No.: US 9,826,164 B2
(45) Date of Patent: Nov. 21, 2017

(54) MARINE ENVIRONMENT DISPLAY DEVICE

(71) Applicant: Furuno Electric Co., Ltd., Nishinomiya (JP)

(72) Inventors: Brice Pryszo, Bidart (FR); Iker Pryszo, Beaverton, OR (US); Mathieu Jacquinot, Bidart (FR)

(73) Assignee: Furuno Electric Co., Ltd., Nishinomiya (JP)

( * ) Notice: Subject to any disclaimer, the term of this patent is extended or adjusted under 35 U.S.C. 154(b) by 204 days.

(21) Appl. No.: 14/292,732

(22) Filed: May 30, 2014

(65) Prior Publication Data
US 2015/0350552 A1 Dec. 3, 2015

(51) Int. Cl.
*H04N 7/18* (2006.01)
*H04N 5/232* (2006.01)
(Continued)

(52) U.S. Cl.
CPC ......... *H04N 5/23293* (2013.01); *B63B 49/00* (2013.01); *G06T 11/206* (2013.01);
(Continued)

(58) Field of Classification Search
CPC .......... H04N 5/232; H04N 5/265; H04N 7/18; H04N 5/23293; H04N 5/23203;
(Continued)

(56) References Cited

U.S. PATENT DOCUMENTS 3,507,993 A * 4/1970 Mulley ................... G01C 21/22
345/632
5,486,819 A * 1/1996 Horie ................... G05D 1/0246
340/901
(Continued)

FOREIGN PATENT DOCUMENTS

| CA | 2282064 A1 | 1/2001 | |
|---|---|---|---|
| DE | 19754582 A1 * | 6/1999 | ............. B63B 49/00 |
| EP | 2466258 A1 * | 6/2012 | ............. G01C 21/20 |
| WO | 2010041034 A1 | 4/2010 | |
| WO | WO 2010041034 A1 * | 4/2010 | ........... G06T 7/0081 |

OTHER PUBLICATIONS

Ian Brown, Google Boat View, Wednesday, Feb. 26, 2014 http://googlesightseeing.com/2014/02/google-boat-view/.*
European Patent Office, Extended European Search Report Issued in Application No. 15166550.2, dated Oct. 5, 2015, Germany, 10 pages.

(Continued)

*Primary Examiner* — Luke Ratcliffe
*Assistant Examiner* — Amie M N'Dure
(74) *Attorney, Agent, or Firm* — Alleman Hall Creasman & Tuttle LLP

(57) ABSTRACT

Disclosed is a marine environment display device for georeferencing an image stream of a marine environment captured by a camera. The marine environment display device may comprise an image receiver configured to receive an image of the image stream from the camera, a location receiver configured to receive an object location of an object, an image generator configured to generate, from the image, a projected image having location information associated with each of a plurality of points on the projected image and corresponding to a camera position and field of view of the camera, an object generator configured to generate an object indicator at a position on the projected image based on the object location and the location information, and a display configured to display the projected image and the object indicator at the position on the projected image.

18 Claims, 15 Drawing Sheets

(51) Int. Cl.
*G06T 11/20* (2006.01)
*H04N 5/265* (2006.01)
*B63B 49/00* (2006.01)

(52) U.S. Cl.
CPC .......... *H04N 5/23203* (2013.01); *H04N 5/265* (2013.01); *H04N 7/18* (2013.01); *H04N 7/183* (2013.01)

(58) Field of Classification Search
CPC ....... H04N 7/183; G06T 11/20; G06T 11/206; B63B 49/00
USPC ......... 367/131, 15, 103, 118, 129, 134, 138, 367/141, 142, 2, 99, 117, 127, 132, 133, 367/14, 153, 157, 178, 188, 19, 21, 3, 4, 367/5, 87, 89, 901, 904, 909
See application file for complete search history.

(56) References Cited

U.S. PATENT DOCUMENTS

| | | | |
|---|---|---|---|
| 5,528,735 A * | 6/1996 | Strasnick | G06F 3/04815 345/427 |
| 7,511,736 B2 | 3/2009 | Benton | |
| 2004/0239688 A1* | 12/2004 | Krajec | G01S 5/0257 345/629 |
| 2009/0096867 A1* | 4/2009 | Skjelten | G01S 7/22 348/113 |
| 2009/0138138 A1* | 5/2009 | Ferren | G01C 23/00 701/3 |
| 2009/0189895 A1* | 7/2009 | James | A63F 13/10 345/420 |
| 2010/0256863 A1* | 10/2010 | Nielsen | G07C 5/085 701/31.4 |
| 2011/0064312 A1* | 3/2011 | Janky | G01C 15/00 382/195 |
| 2011/0148623 A1* | 6/2011 | Bishop | G01C 21/20 340/539.13 |
| 2011/0191058 A1* | 8/2011 | Nielsen | B65D 83/203 702/130 |
| 2013/0265333 A1 | 10/2013 | Ainsworth et al. | |

OTHER PUBLICATIONS

Hugues, Olivier et al., "Merging Video and Charts for Augmented Reality by Vision and Inertial Fusion to Perform Horizon Tracking", Springer Virtual Reality, vol. 17, No. 3, Feb. 11, 2013, 9 pages.

* cited by examiner

MARINE ENVIRONMENT DISPLAY DEVICE

BACKGROUND

Navigation of maritime vessels typically requires accessing and processing numerous independent streams of data. The geographical position of the vessel, weather, wind speed and direction, tide and current speed, the relation of the position of the vessel to charted surface and subsurface features, measured depth of the water beneath the vessel, speed of the vessel, and the position, bearing, and speed of other vessels are just a few examples of the information that may be processed to allow an individual to safely navigate a maritime environment. A vessel operator may use multiple instruments, charts, and visual information to obtain the necessary information describing a dynamic maritime environment. Sometimes, it can be challenging for the vessel operator to synthesize such data from these multiple sources, and correlate this data with the actual view of the surroundings of the vessel.

SUMMARY

To address the above issues, devices and methods for georeferencing an image stream of a marine environment captured by a camera are disclosed herein. According to one aspect, a marine environment display device may comprise an image receiver configured to receive an image of the image stream from the camera, a location receiver configured to receive an object location of an object, an image generator configured to generate, from the image, a projected image having location information associated with each of a plurality of points on the projected image and corresponding to a camera position and field of view of the camera, an object generator configured to generate an object indicator at a position on the projected image based on the object location and the location information, and a display configured to display the projected image and the object indicator at the position on the projected image.

In this aspect, the marine environment display device may further comprise a chart engine program configured to provide, from chart data, a virtual marine environment corresponding to the camera position and field of view of the camera. Each of a plurality of points on the virtual marine environment may be associated with the location information and correspond to a respective point of the plurality of points on the projected image. The image generator may be configured to generate the projected image by projecting the image onto the virtual marine environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
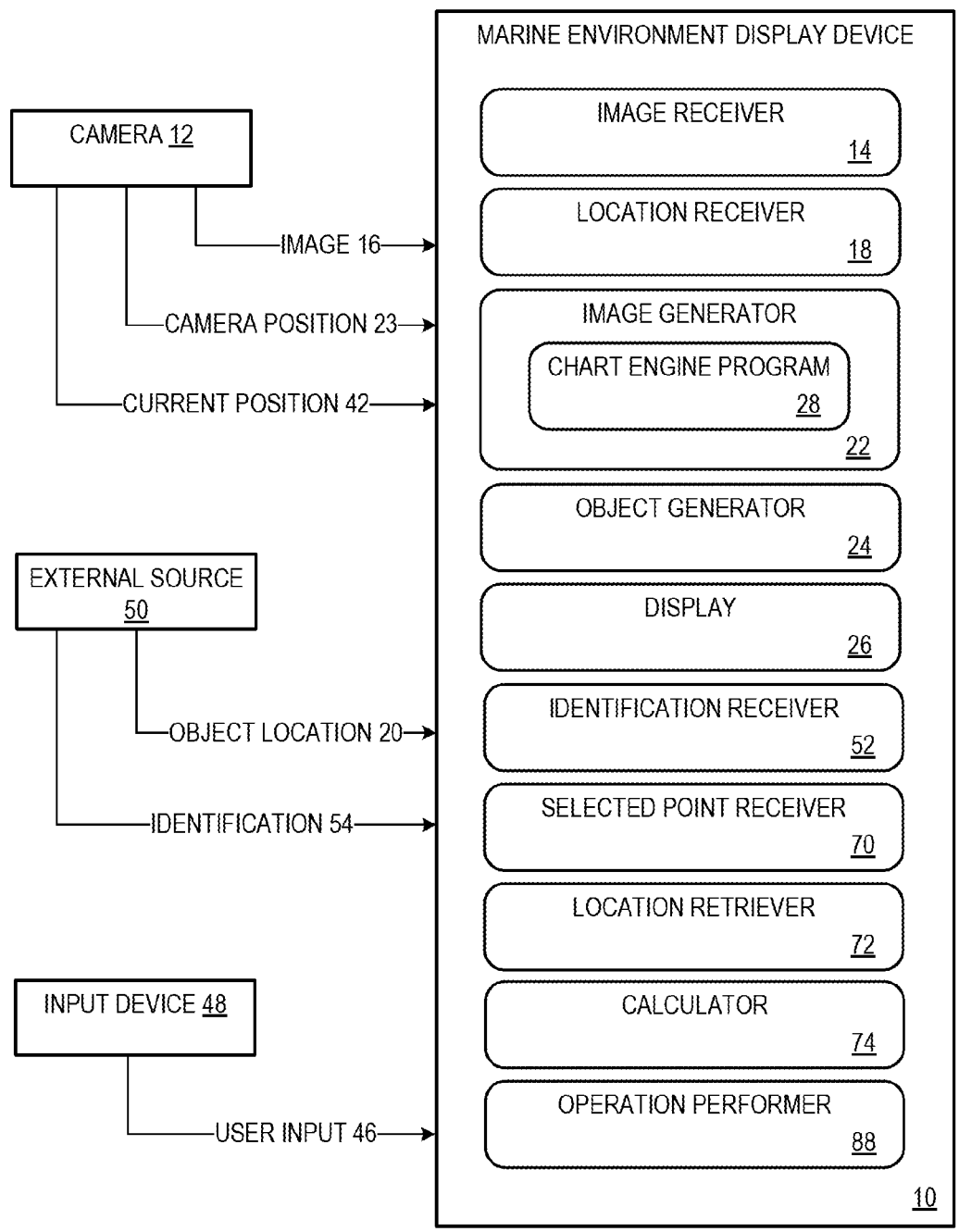
FIG. 1 is a simplified schematic view of a marine environment display device receiving inputs.

Referring initially to FIG. 1, a marine environment display device 10 is illustrated, which may be part of a navigation suite of a maritime vessel. The marine environment display device 10 is configured to receive inputs from various input sources. It will be appreciated that the marine environment display device 10 is for georeferencing an image stream of a marine environment captured by a camera 12.

Accordingly, the marine environment display device 10 may comprise an image receiver 14 configured to receive an image 16 of the image stream from the camera 12, a location receiver 18 configured to receive an object location 20 of an object in the marine environment, an image generator 22 configured to generate, from the image 16, a projected image having location information associated with each of a plurality of points on the projected image and corresponding to a camera position 23 and field of view of the camera 12, an object generator 24 configured to generate an object indicator at a position on the projected image based on the object location 20 and the location information, and a display 26 configured to display the projected image and the object indicator at the position on the projected image.

Figure 2:
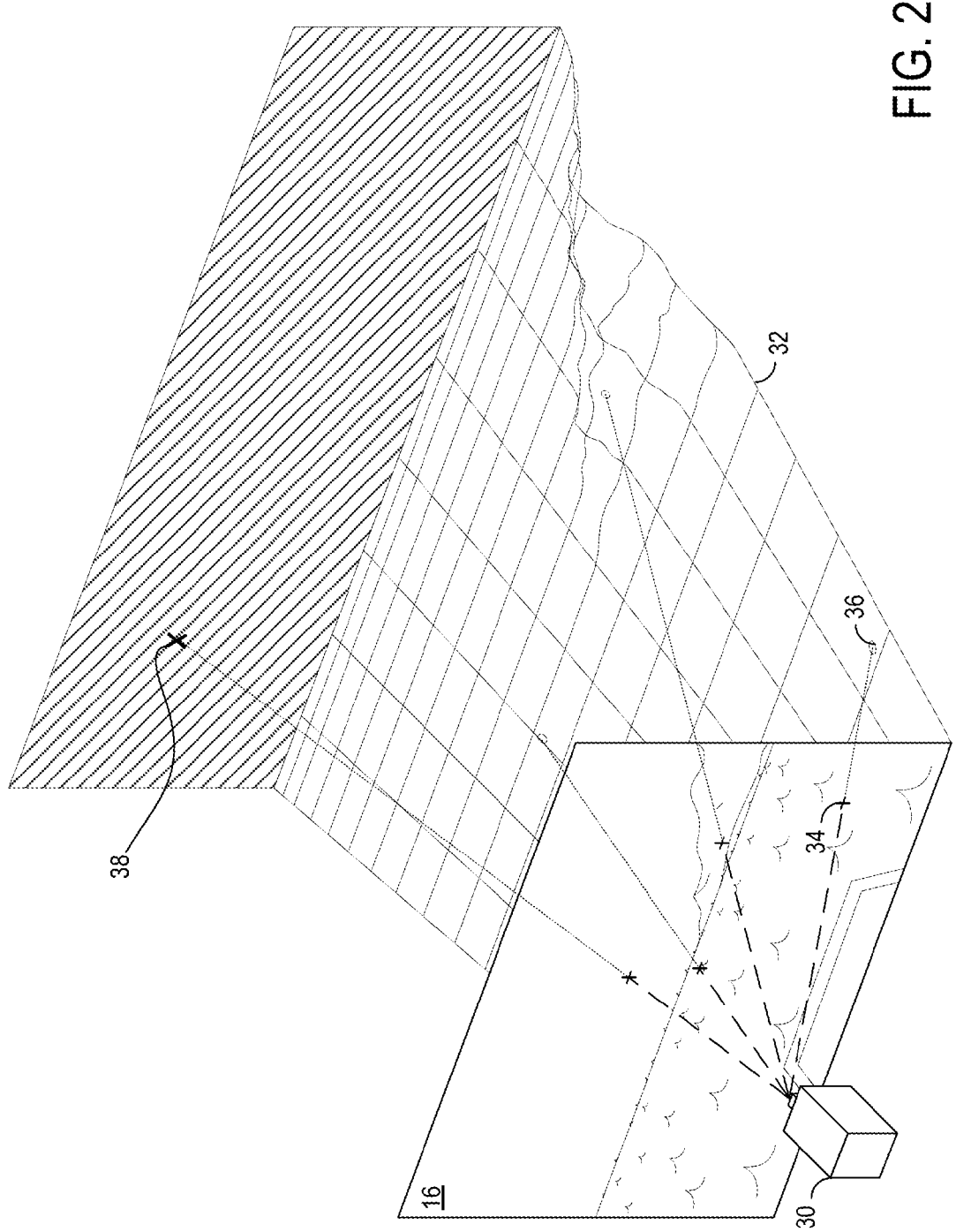
FIG. 2 is an illustrative example of an image being projected onto a virtual marine environment.

The image generator 22 may comprise a chart engine program 28 configured to provide, from chart data, a virtual marine environment corresponding to the camera position and field of view of the camera 12. The virtual marine environment may be three-dimensional (3D), and it may include a virtual mesh or a surface, for example. As illustrated in FIG. 2 discussed below, each of a plurality of points on the virtual marine environment may be associated with the location information and correspond to a respective point of the plurality of points on the projected image. The image generator 22 may be configured to generate the projected image by projecting the image 16 onto the virtual marine environment.

FIG. 2 is an illustrative example of the image being projected onto the virtual marine environment. A virtual camera 30 may be positioned at a projection point corresponding to the camera position of the camera 12 and having a virtual field of view corresponding to the field of view of the camera 12. Various lines of sight within the virtual field of view of the virtual camera 30 are indicated in FIG. 2 by dashed lines until intersecting the image 16, and then by dotted lines until intersecting the virtual marine environment 32. For example, one line of sight of virtual camera 30 intersects the image 16 at a point 34 and intersects the virtual marine environment 32 at a point 36 such that point 34 may correspond to point 36. Point 34 may be one of a plurality of points of the image 16, indicated by plus signs in FIG. 2. Point 36 may be one of a plurality of points of the virtual marine environment 32, indicated by circles. The object generator 24 of FIG. 1 may generate the object indicator at the position on the projected image based on the object location 20 and each of the plurality of points on the virtual marine environment 32.

A point 38, represented by an X in FIG. 2, may correspond to a point on the image 16 in the sky. Because the sky is infinitely far away from the camera 12, point 38 may not be able to be projected upon in this manner. The sky, represented by a hashed plane, may not exist in the virtual marine environment 32. When the projected image is generated, the sky may be represented as in the image 16, but the location information of points therein may not be obtainable. However, each point, pixel, or very small area of the projected image within the marine environment itself may include the respective location information such that the projected image may be considered to be georeferenced.

Figure 3:
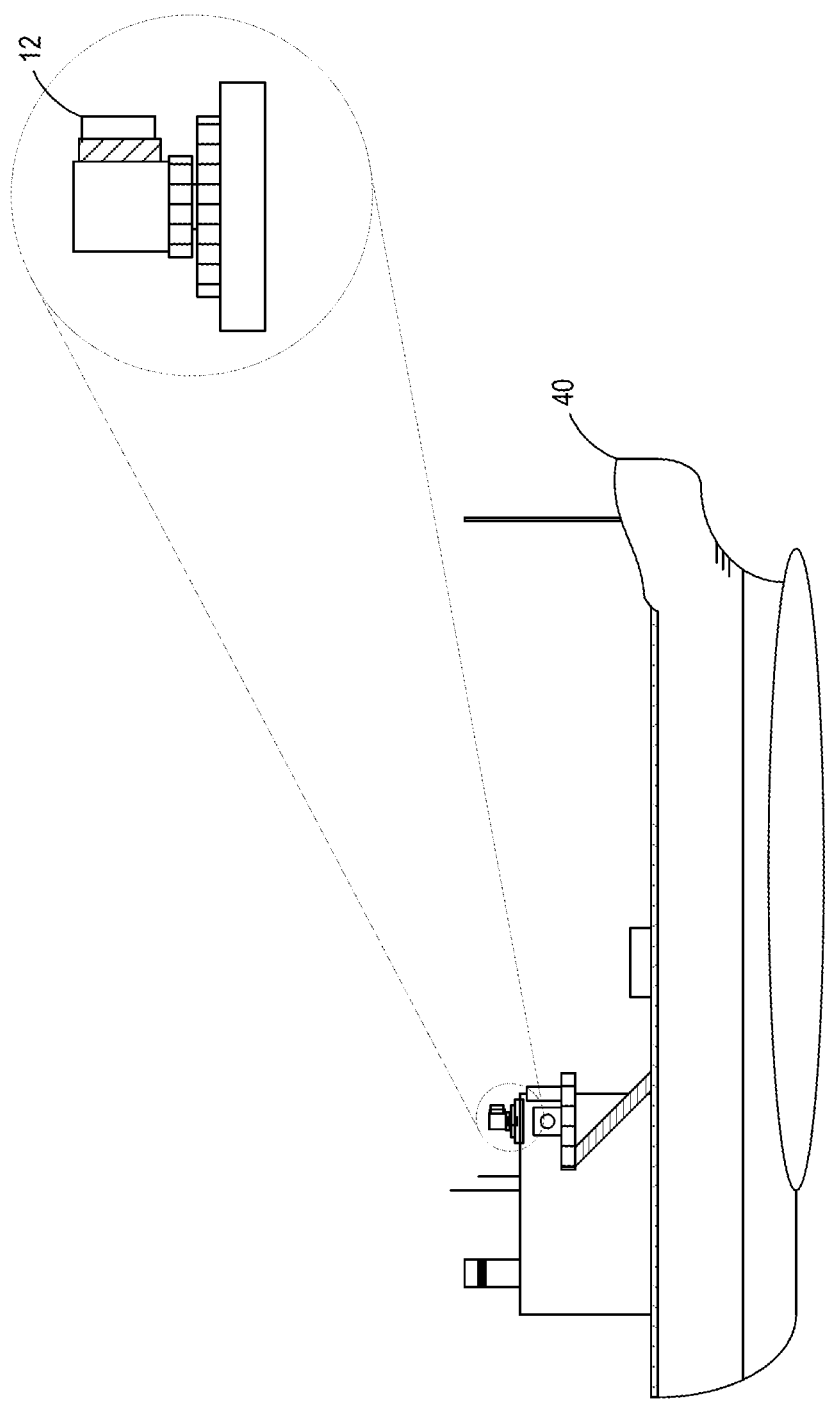
FIG. 3 is an illustrative example of a camera on board a maritime vessel.
Figure 4:
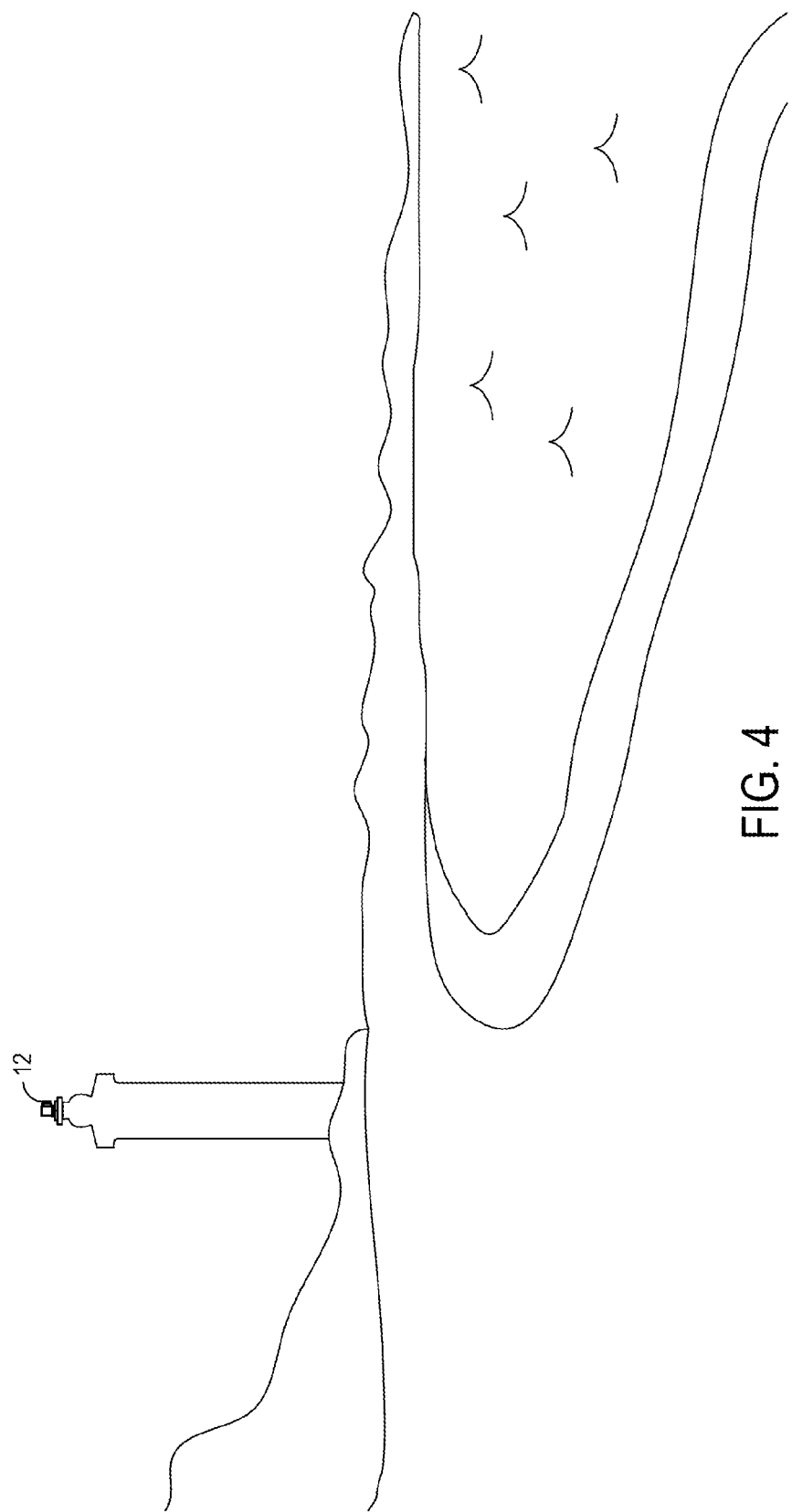
FIG. 4 is an illustrative example of a shore-mounted camera.

FIG. 3 is an illustrative example of the camera on board a maritime vessel, and FIG. 4 is an illustrative example of a shore-mounted camera, an alternative to the on-board camera of FIG. 3. With regard to FIG. 3, the camera 12 may be a remote controlled camera on board a maritime vessel 40. When the camera 12 is on board, a distance from the camera 12 to the maritime vessel 40 may be fixed, but both the maritime vessel 40 and camera 12 may change location and orientation while the maritime vessel 40 traverses a body of water. When the camera 12 is shore-mounted as in FIG. 4, the distance from the camera 12 to the maritime vessel 40 may not be fixed, but the camera 12 may capture a steady image stream without being tossed about by moving water. In this case, multiple cameras 12 may be used at different locations as the marine vessel 40 travels.

Figure 5:
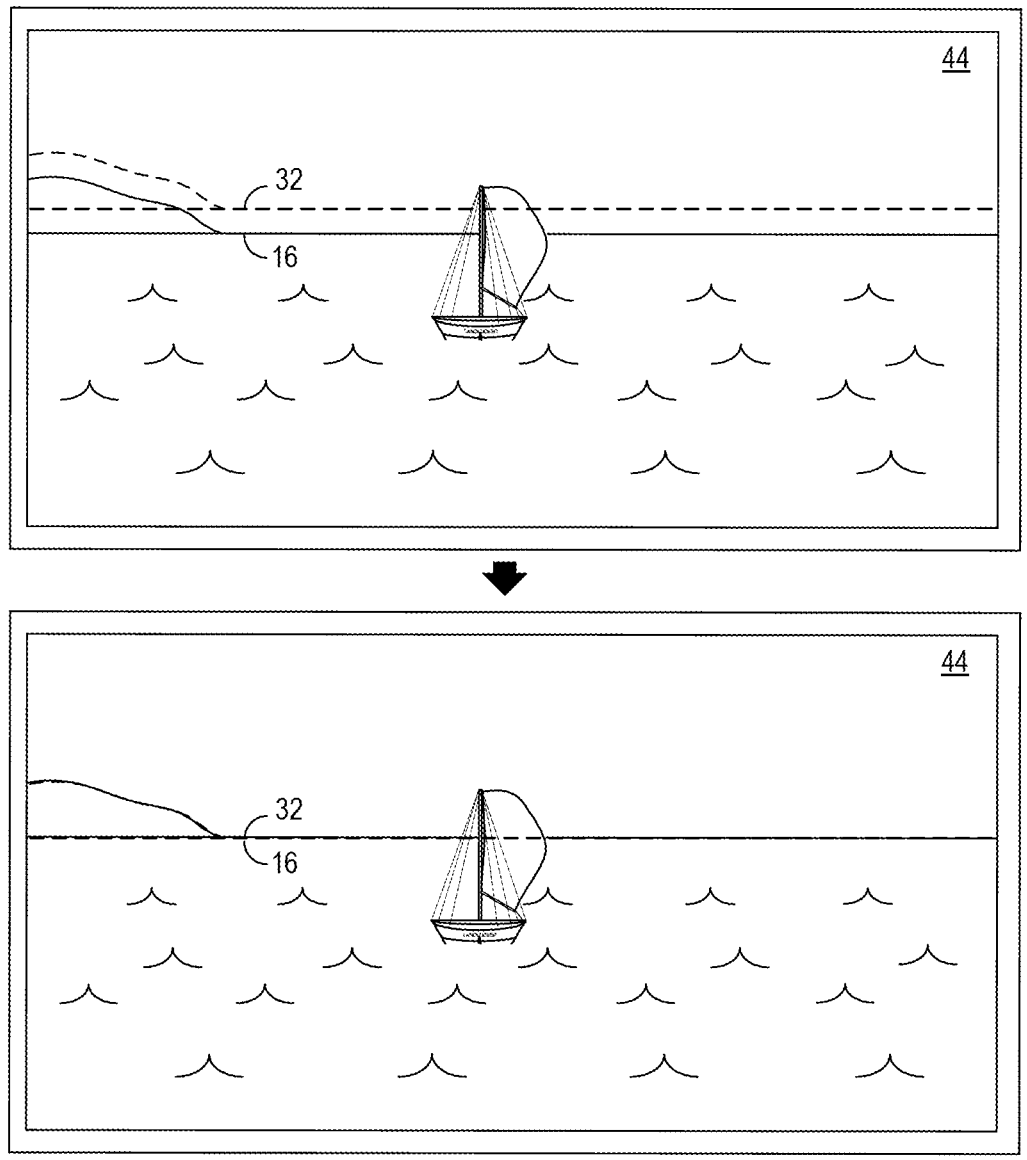
FIG. 5 depicts a response to feedback from the camera.

Returning briefly to FIG. 1, the camera position 23 may be at least partially based on a feedback signal from the camera 12 indicating a current position 42 of the camera 12. FIG. 5 depicts a response to feedback from the camera. In the projected image 44, the image 16 and/or the virtual marine environment 32 may be partially transparent such that both are simultaneously visible when displayed. Initially, the virtual marine environment 32 and the image 16 are misaligned in FIG. 5. As the maritime vessel 40 of FIG. 3 traverses a body of water, such misalignment may temporarily occur. Additionally, the marine environment display device 10 may receive user input 46 via input device 48 requesting a change in field of view of the camera 12. The camera 12 may move in response, then send the feedback signal to indicate the current position 42 of the camera 12, including an orientation, to the marine environment display device 10.

In order to obtain an accurate alignment of the virtual marine environment 32 and the image 16, if the marine environment display device 10 is mounted on the maritime vessel 40, the marine environment display device 10 may use the current position 42 of the camera 12 and a current position of the maritime vessel as determined by, for example, a geo-positional sensor such as a global positioning system (GPS) receiver, to obtain a relative position of the camera 12. In addition, a current attitude of the maritime vessel 40 may be determined by a three-direction attitude sensor and used to obtain the relative position of the camera 12. The relative position of the camera 12 may be used to determine the field of view of the camera 12 such that it may be aligned with the virtual field of view of the virtual marine environment 32.

The camera 12 may comprise a gyroscope, an accelerometer, and/or a GPS receiver, used in any combination to derive the current position 42 of the camera. An altitude difference between the camera 12 and the marine environment display device 10 or the GPS receiver of the maritime vessel 40 may also be measured and inputted by an operator during a setup operation. The camera 12 may also determine the current position 42 by tracking mechanical movement of the camera 12, for example. Not only may the alignment be improved in this manner, but the location information of the projected image 44 may also be more accurate, as well as the position corresponding to the object location 20.

Returning to FIG. 1, the object location 20 may be received from an external source 50, which may be at least one of chart data, Automatic Identification System (AIS), Automatic Radar Plotting Aid (ARPA), and Digital Selective Calling (DSC), for example. The chart data may also be stored within the marine environment display device 10. When the object location 20 is received from an external source 50 such as ARPA that utilizes radar, objects along the same line of sight, particularly on a horizon, may not all be detectable. For instance, if a ship is behind a land mass and blocked from the field of view of the camera 12, the object location 20 of the ship may not be received through radar. However, if the object location 20 of the ship is emitted by, for example, a transponder, the locations 20 of both overlapping objects may be received by the marine environment display device 10.

The marine environment display device 10 may further comprise an identification receiver 52 configured to receive an identification 54 of the object. The object may be a fixed object, and the object location 20 may be received from the chart data. For example, the fixed object may be a lighthouse or other object that does not move. Alternatively, the object may be a moving object, and the object location 20 may be received from at least one of AIS, ARPA, and DSC. The moving object may be one of various types of maritime vessels or buoys, for example.

Figure 6:
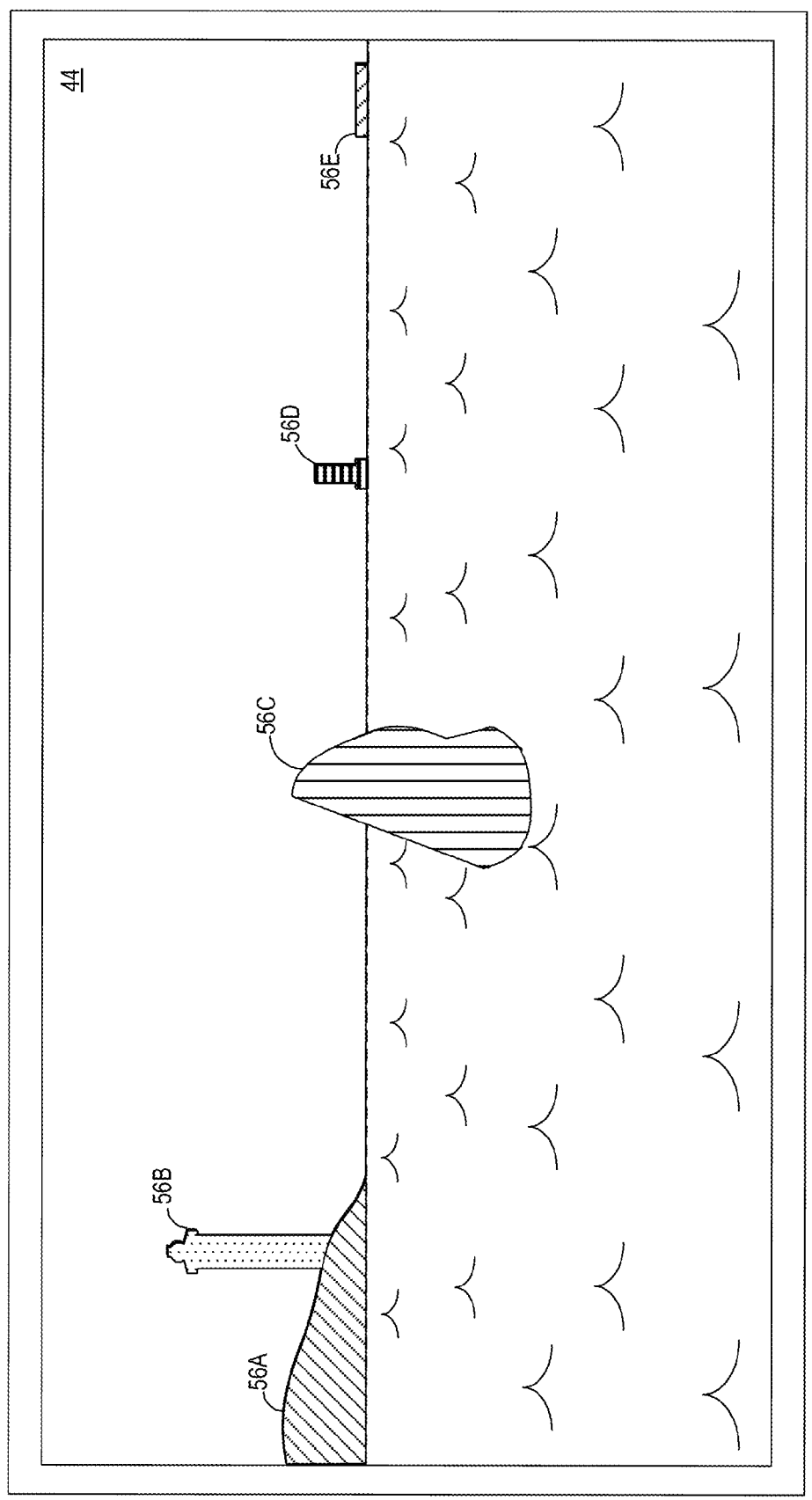
FIG. 6 is an illustrative example of object indicators as icons.

FIG. 6 is an illustrative example of object indicators as icons on the projected image 44. The object indicator 56A-E may be an icon or symbol with a shape and/or a color that is based on the identification 54. For example, object indicator 56A may represent a land mass and have the shape of the land mass as determined from the chart data. Object indicator 56B may be in the shape of a lighthouse per the identification 54 and the object location 20 and the identification 54 may be received from the chart data or ARPA. Likewise, object indicators 56C-E may have a sailboat shape, buoy shape, and barge shape, and the object location 20 and identification 54 may be received from AIS, ARPA, and DSC, respectively. Any other suitable marine communication and identification method may be used. The icons 56A-E may be superimposed on the respective objects captured in projected image 44.

In FIG. 6, different colors are represented by different patterns, e.g. the horizontal stripes of object indicator 56D may represent green, and the vertical stripes of object indicator 56C may represent red. The appearance of the icon, e.g. the color, may be used to indicate danger or any other current status. For instance, if a projected course of object indicator 56C is calculated to collide with that of the maritime vessel 40, object indicator 56C may flash or become red. Different colors may also designate fixed versus moving objects, different speeds, different external sources 50, etc.

Figure 7:
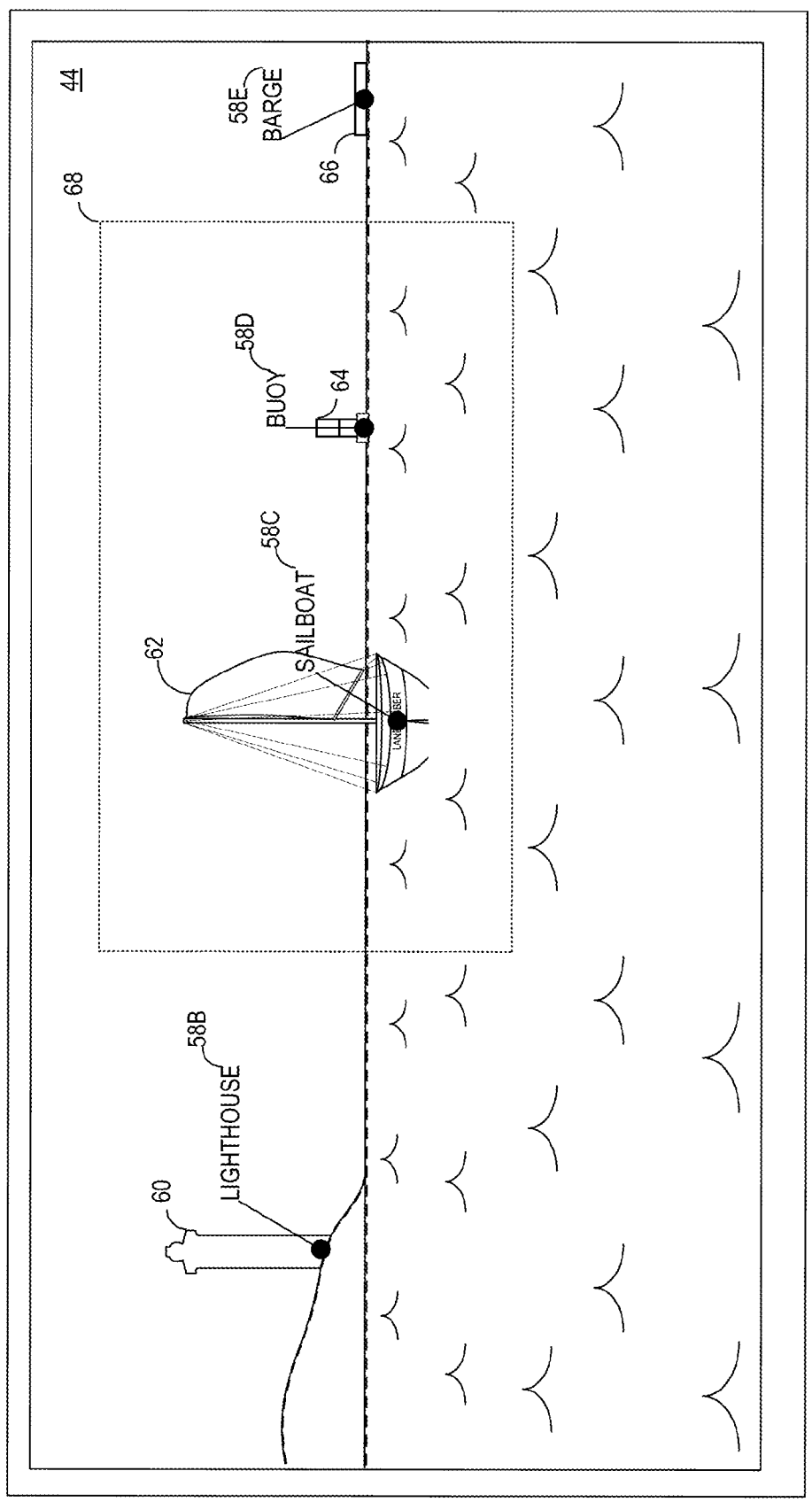
FIG. 7 is an illustrative example of the object indicators as text labels.

FIG. 7 is an illustrative example of the object indicators as text labels. The object indicator may be a text label, which may be descriptive of the object, the object location, etc., or it may be arbitrarily assigned. Text label 58B, which reads LIGHTHOUSE, may correspond to lighthouse 60. Likewise, text label 58C may correspond to sailboat 62, text label 58D may correspond to buoy 64, and text label 58E may correspond to barge 66.

Figure 8:
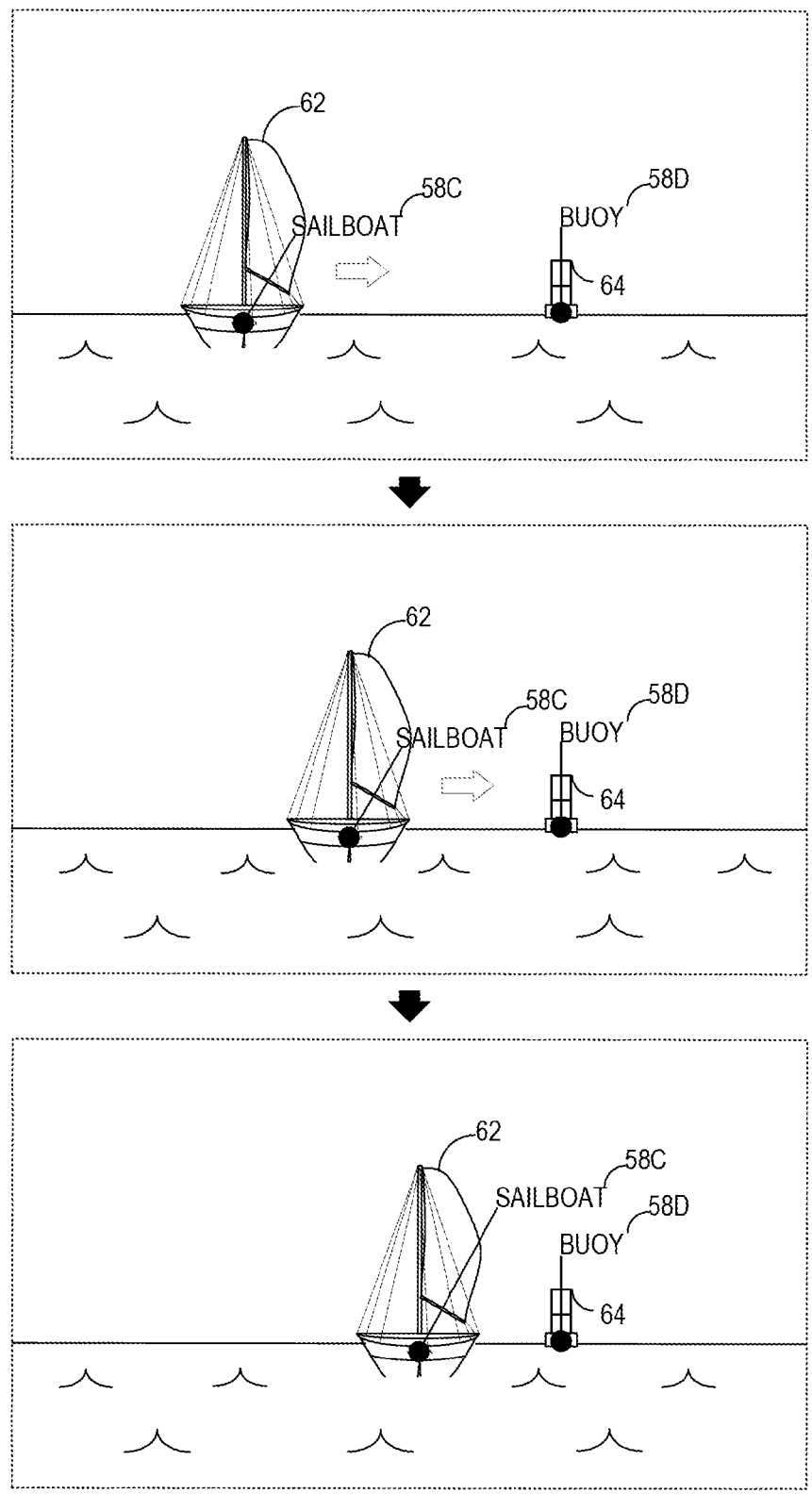
FIG. 8 depicts one of the text labels being repositioned to avoid overlapping another text label.

Additionally, the object generator 24 may be further configured to reposition the text label to avoid overlapping a second text label of a second object indicator. FIG. 8 depicts one of the text labels being repositioned to avoid overlapping another text label. In an expanded view of area 68 of FIG. 7, sailboat 62 is moving toward buoy 64. As the sailboat 62 approaches the buoy 64, the text label 58C moves out of the way of text label 58D to avoid overlapping or colliding with the text label 58D. In the depicted example, text label 58C moves upward, but any suitable combination of movements between text labels 58C and 58D is acceptable.

Returning to FIG. 1, the marine environment display device 10 may further comprise a selected point receiver 70 configured to receive user input 46 via input device 48 selecting a point of the plurality of points on the projected image, and a location retriever 72 configured to retrieve a location associated with the selected point. The display 26 may be further configured to display the location of the selected point. When displaying the location of the selected point, the marine environment display device 10 may further comprise a calculator 74 configured to calculate a distance to the location of the selected point from the camera location based on the horizon at sea or a Depth Elevation Model on land. The display 26 may be further configured to display a distance indicator indicating the distance.

Figure 9:
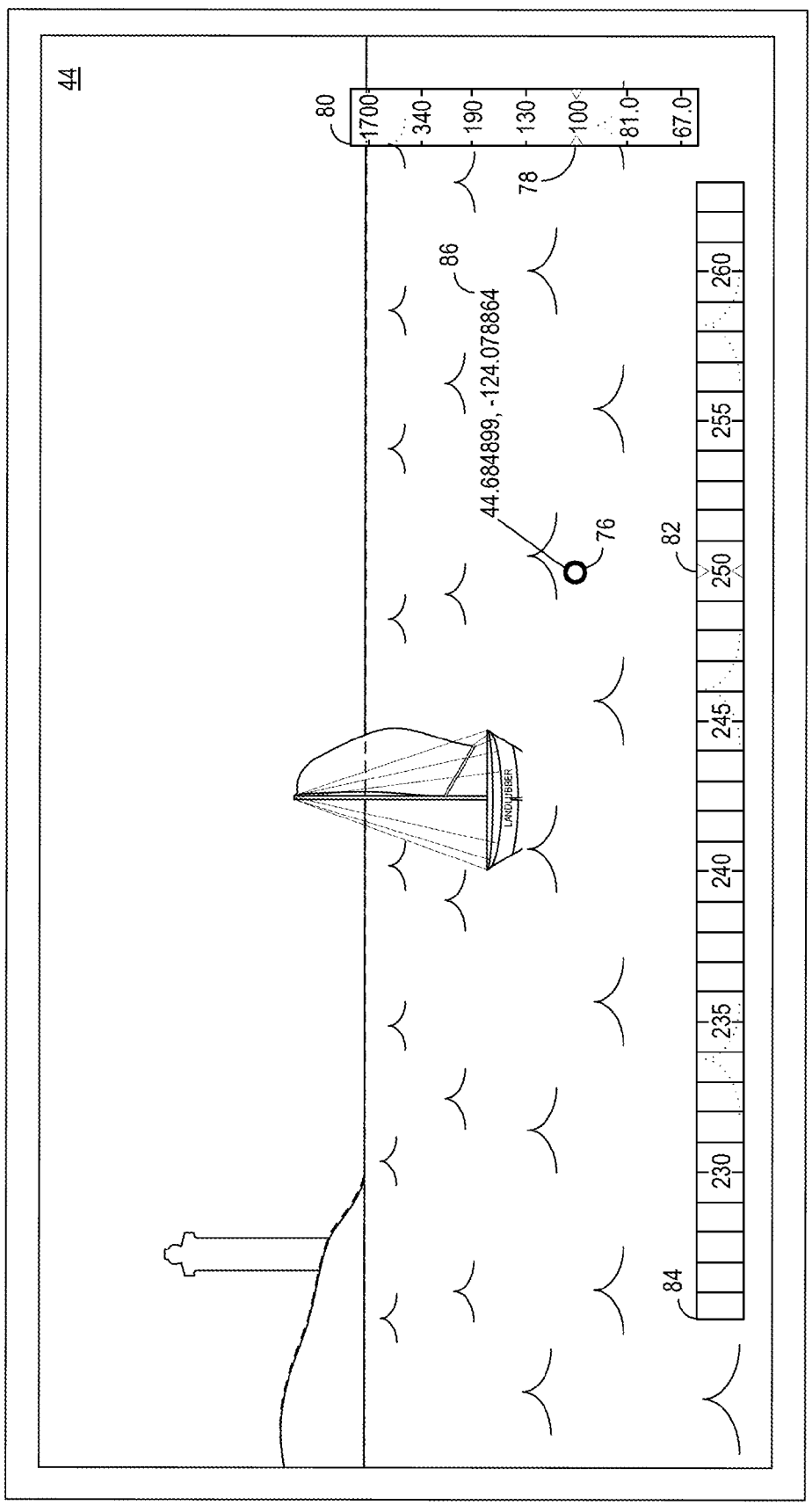
FIG. 9 depicts the marine environment display device displaying a distance indicator and a location of a selected point.

FIG. 9 depicts one example of displaying the distance indicator and the location of the selected point. A selected point 76, illustrated as a small circle, may be selected by the user input 46 through the input device 48. The input device 48 may be a touch screen, mouse, keyboard, etc. Selecting the selected point 76 may comprise clicking, tapping, etc. the input device 48 as appropriate, but also may include navigating a cursor over the selected point 76 in the case of displaying the distance. In one implementation, the distance indicator 78 points to a value on a vertical scale 80 and the location is displayed by a bearing indicator 82 pointing to a value on a horizontal scale 84. In another implementation, the location and/or distance of the selected point are displayed in a label 86, similar to the text labels 58A-E of the object indicators. In this case, the location may include a latitude, longitude, and/or altitude of the selected point 76.

Figure 10:
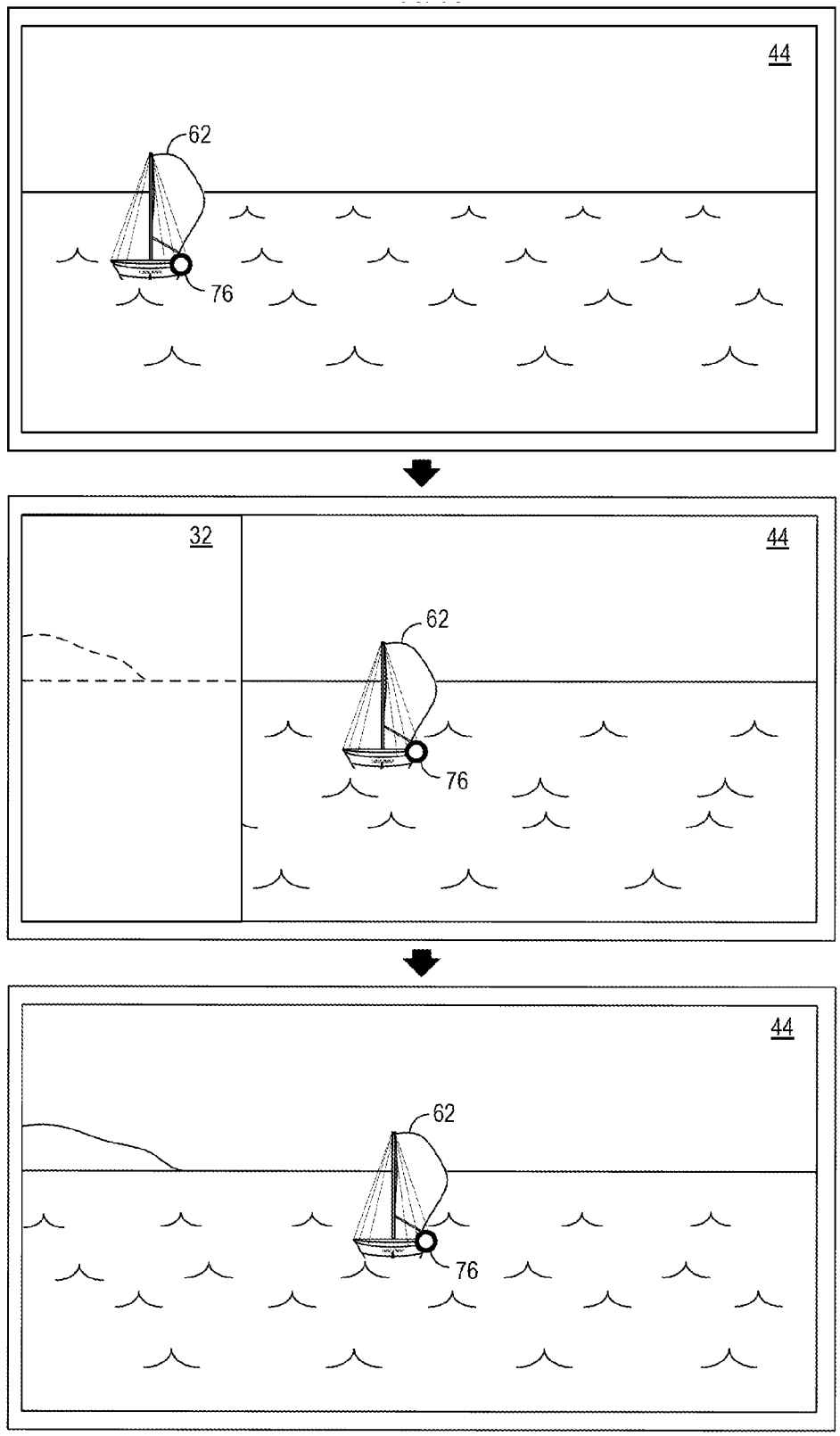
FIG. 10 is an illustrative example of the marine environment display device performing a panning operation of the camera.

The marine environment display device 10 may further comprise an operation performer 88 configured to perform a zoom operation and/or a pan operation centered on the selected point. The operation may be centered on the selected point 76 based on the location associated with the selected point 76. Accordingly, FIG. 10 is an illustrative example of the marine environment display device performing a panning operation of the camera. The marine environment display device 10 may receive user input 46 to change the field of view of the camera 12 through input device 48. The panning operation may be centered on the selected point 76, located on the sailboat 62, based on the location retrieved from projected image 44. When panning, a portion of the projected image 44 may not be available due to lag between the marine environment display device 10 and the camera 12, and this portion may be filled by a buffered image or the virtual marine environment 32 until a current projected image is available.

Figure 11:
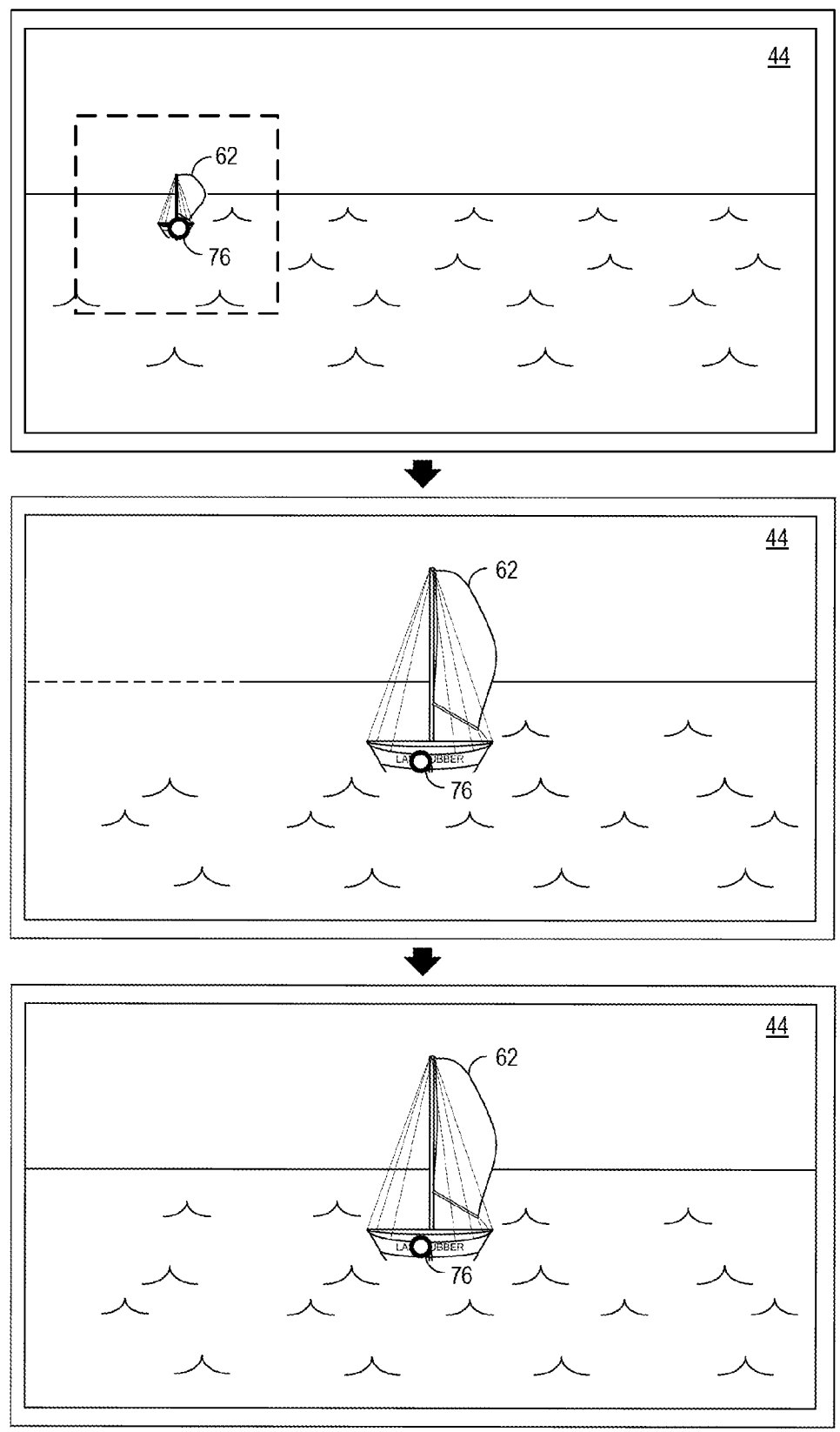
FIG. 11 is an illustrative example of the display device performing a zoom in operation.
Figure 12:
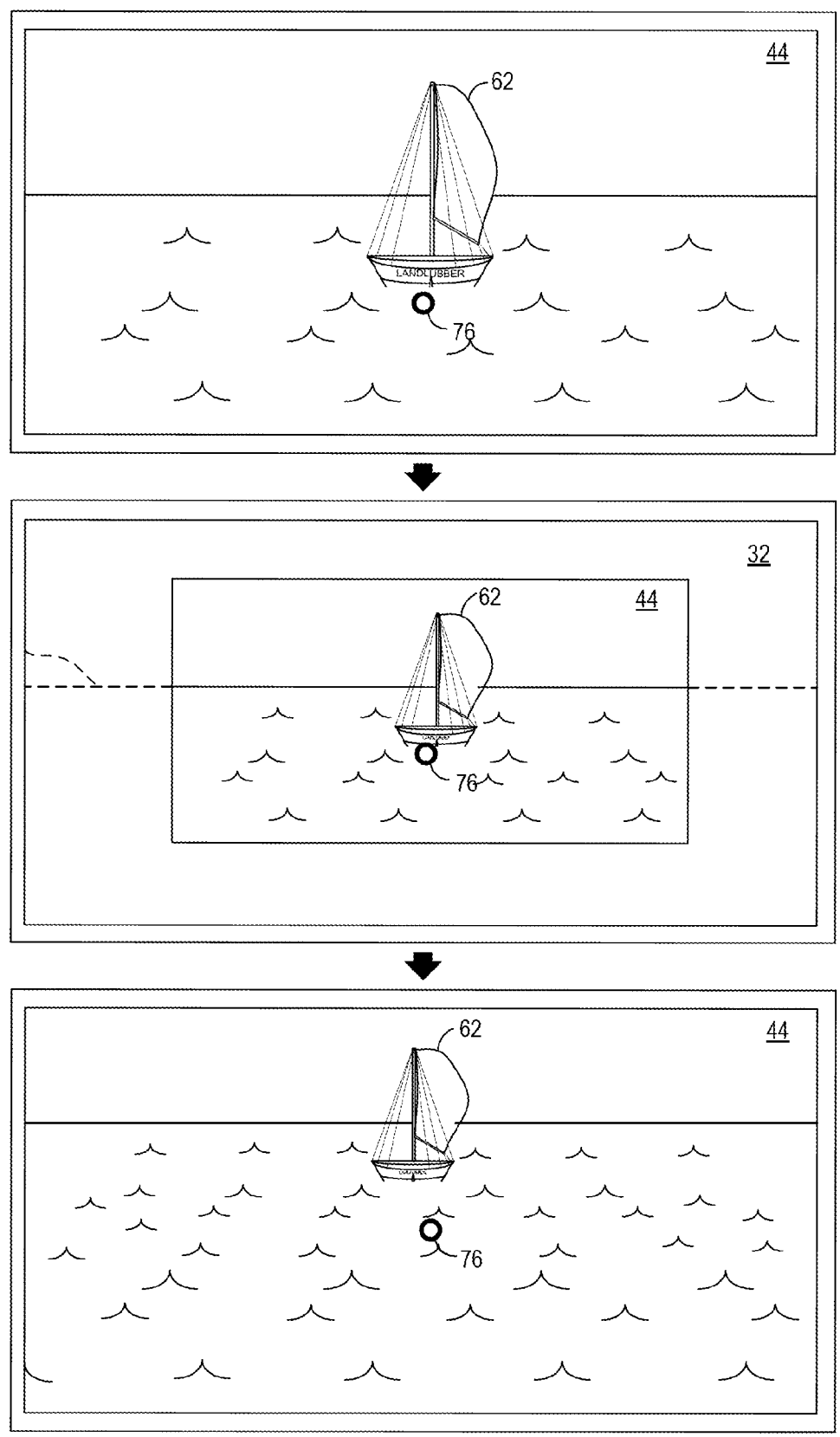
FIG. 12 is an illustrative example of the display device performing a zoom out operation.

FIG. 11 is an illustrative example of the display device performing a zoom in operation, while FIG. 12 is an illustrative example of the display device performing a zoom out operation. Similarly to the panning operation, the zoom operations may also involve displaying the virtual marine environment 32 where a portion of the projected image 44 is not available, and the zoom operations may also be centered on the selected point 76 based on the location retrieved from projected image 44.

Figure 13A:
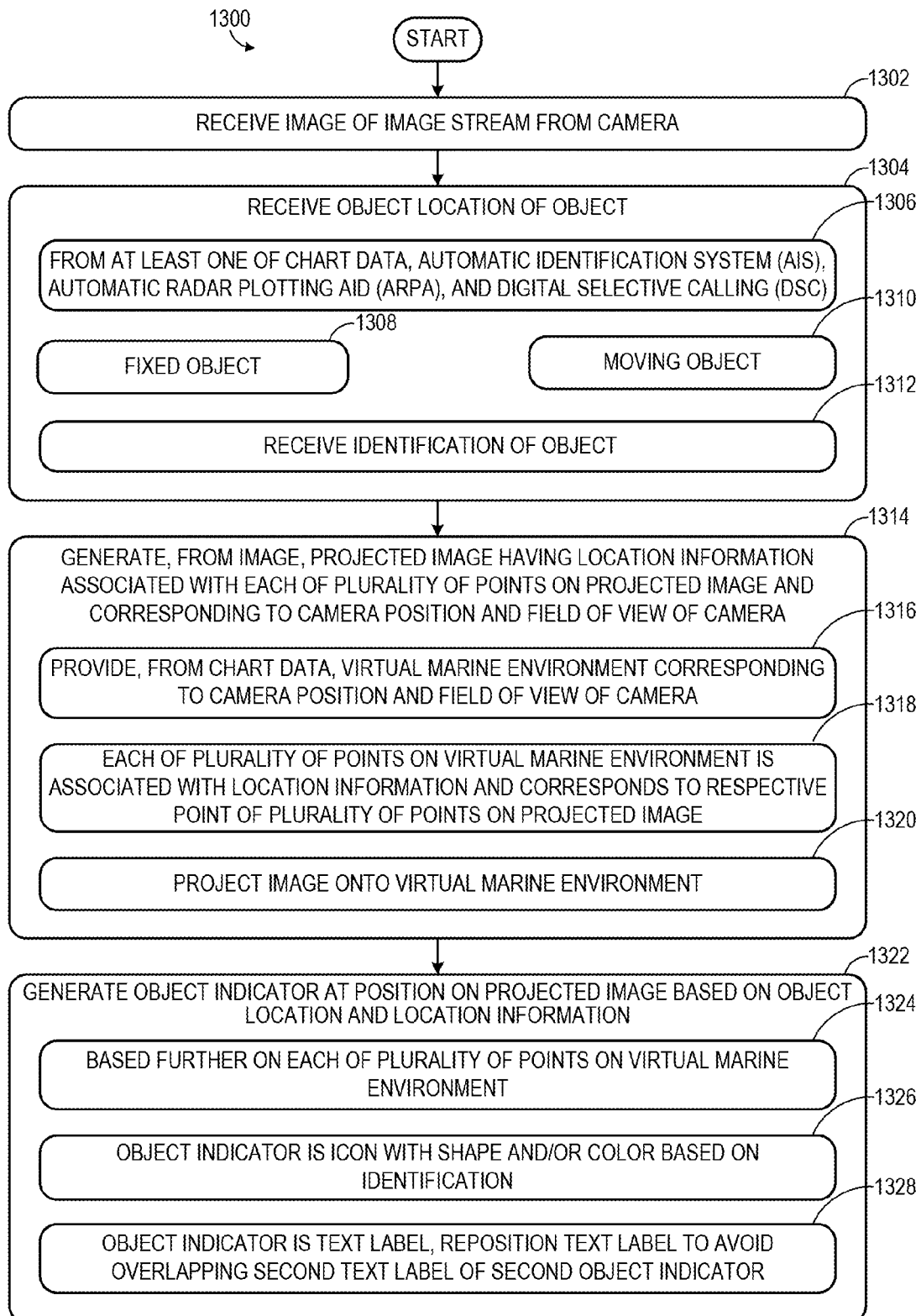
FIGS. 13A and 13B are a flowchart of a method for georeferencing an image stream of a marine environment captured by the camera.
Figure 13B:
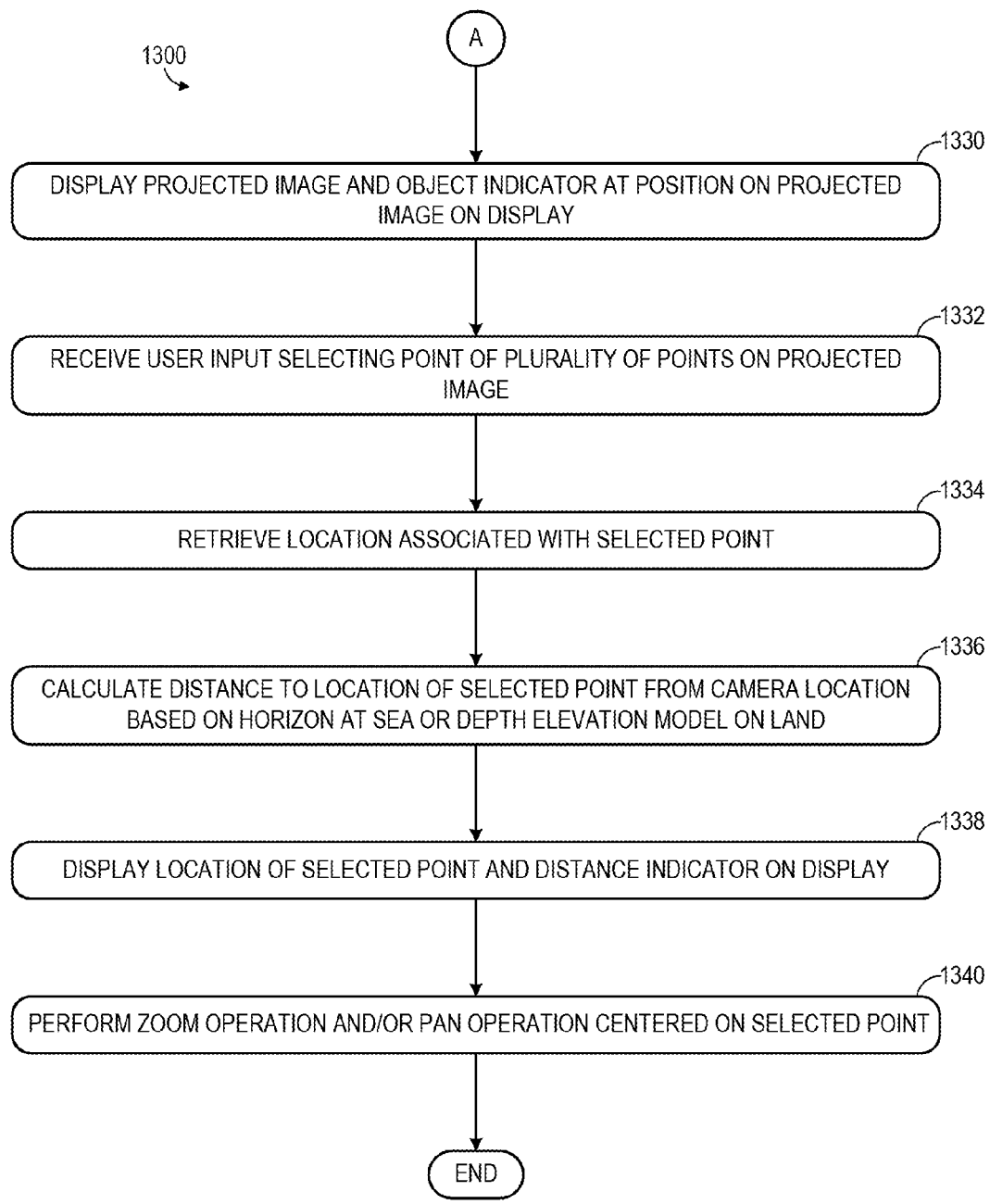

FIGS. 13A and 13B are a flowchart of a method 1300 for georeferencing an image stream of a marine environment captured by a camera. The following description of method 1300 is provided with reference to the software and hardware components of the marine environment display device described above and shown in FIGS. 1-4. It will be appreciated that method 1300 may also be performed in other contexts using other suitable hardware and software components.

With reference to FIG. 13A, at 1302 the method 1300 may include receiving an image of the image stream from the camera. At 1304 the method 1300 may include receiving an object location of an object. At 1306 the object location may be received from at least one of chart data, Automatic Identification System (AIS), Automatic Radar Plotting Aid (ARPA), and Digital Selective Calling (DSC). It will be appreciated that as indicated at 1308, the object may be a fixed object, or as indicated at 1310, the object may be a moving object. Further, at 1312, the method 1300 may include receiving an identification of the object.

At 1314 the method 1300 may include generating, from the image, a projected image having location information associated with each of a plurality of points on the projected image and corresponding to a camera position and field of view of the camera. At 1316 the method 1300 may include providing, from chart data, a virtual marine environment corresponding to the camera position and field of view of the camera. As described above, the virtual marine environment typically comprises a 3D mesh of a plurality of points built from chart data, which represents the topography of the marine environment surrounding the vessel. At 1318 each of a plurality of points on the virtual marine environment may be associated with the location information and correspond to a respective point of the plurality of points on the projected image. At 1320 the method 1300 may include projecting the image onto the virtual marine environment.

At 1322 the method 1300 may include generating an object indicator at a position on the projected image based on the object location and the location information. At 1324 the object indicator may be generated at the position on the projected image based further on each of a plurality of points on the virtual marine environment. The object indicator may be, for example, an icon with a shape and/or a color that is based on the identification as indicated at 1326. Alternatively, as indicated at 1328, the object indicator may be a text label, and the method 1300 may include repositioning the text label to avoid overlapping a second text label of a second object indicator.

Turning to FIG. 13B, at 1330 the method 1300 may include displaying the projected image and the object indicator at the position on the projected image on a display. At 1332 the method 1300 may include receiving a user input selecting a point of the plurality of points on the projected image. At 1334 the method 1300 may include retrieving a location associated with the selected point. At 1336 the method 1300 may include calculating a distance to the location of the selected point from the camera location based on a horizon at sea or a Depth Elevation Model on land. At 1338 the method 1300 may include displaying the location of the selected point and an indicator of the distance on the display. At 1340 the method 1300 may include performing a zoom operation and/or a pan operation centered on the selected point.

The above described devices and methods may be used to georeference an image stream of a camera such that the image stream may be suitable for use in a navigation suite of a maritime vessel. The devices and methods may include projecting an image of the image stream onto a virtual marine environment, associating location information with a plurality of points on the projected image, and representing real-life objects with object indicators on the projected image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
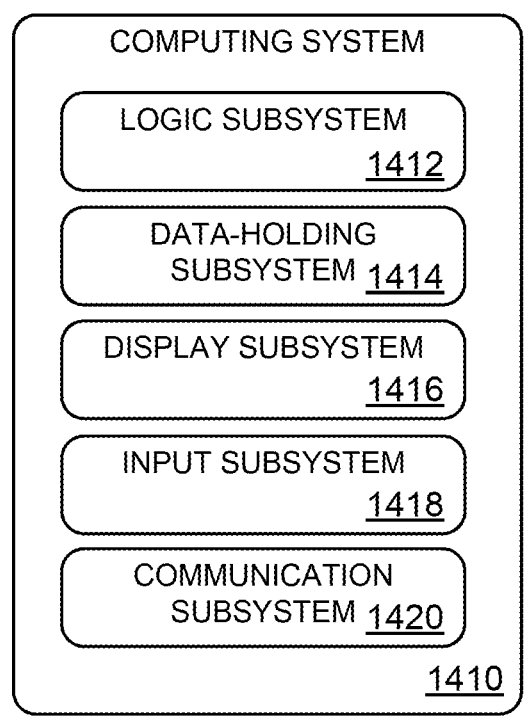
FIG. 14 is a simplified schematic view of an example computing system.

FIG. 14 schematically shows a non-limiting embodiment of a computing system 1410 that can enact one or more of the methods and processes described above. Marine environment display device 10 and camera 12 together may take the form of computing system 1410. Computing system 1410 is shown in simplified form. Computing system 1410 may take the form of one or more personal computers, server computers, tablet computers, network computing devices, mobile computing devices, mobile communication devices (e.g., smart phone), and/or other computing devices.

Computing system 1410 includes a logic subsystem 1412 and a data-holding subsystem 1414. Computing system 1410 may optionally include a display subsystem 1416, input subsystem 1418, communication subsystem 1420, and/or other components not shown in FIG. 14.

Logic subsystem 1412 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Data-holding subsystem 1414 includes one or more physical devices configured to hold instructions executable by the logic subsystem to implement the methods and processes described herein. When such methods and processes are implemented, the state of data-holding subsystem 1414 may be transformed—e.g., to hold different data.

Data-holding subsystem 1414 may include removable and/or built-in devices. Data-holding subsystem 1414 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 1414 may include volatile, nonvolatile, dynamic, static, read/write, read-only, random-access, sequential-access, location-addressable, file-addressable, and/or content-addressable devices.

It will be appreciated that data-holding subsystem 1414 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1412 and data-holding subsystem 1414 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1410 implemented to perform a particular function. In some cases, a module, program, or engine may be instantiated via logic subsystem 1412 executing instructions held by data-holding subsystem 1414. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1416 may be used to present a visual representation of data held by data-holding subsystem 1414. This visual representation may take the form of a graphical user interface (GUI). As the herein described methods and processes change the data held by the data-holding subsystem, and thus transform the state of the data-holding subsystem, the state of display subsystem 1416 may likewise be transformed to visually represent changes in the underlying data. Display subsystem 1416 may include one or more displays utilizing virtually any type of technology. Such displays may be combined with logic subsystem 1412 and/or data-holding subsystem 1414 in a shared enclosure, or such displays may be peripheral displays.

When included, input subsystem 1418 may comprise or interface with one or more user-input devices such as a keyboard, mouse, trackball, touch screen, or joystick. Input subsystem 1418 may also include a camera such as camera 12 for image and/or image stream input, as well as sensors such as geo-positional, positional, orientational, radar, and sonar sensors.

When included, communication subsystem 1420 may be configured to communicatively couple computing system 1410 with one or more other computing devices as well as internally couple various parts of computing system 1410 together. Communication subsystem 1420 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1410 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A marine environment display device for georeferencing an image stream of a marine environment captured by a camera on board a maritime vessel, the marine environment display device comprising:
    an image receiver configured to receive an image of the image stream from the camera;
    a location receiver configured to receive an object location of an object;
    an image generator configured to generate, from the image, a projected image having location information associated with each of a plurality of points on the projected image and corresponding to a relative camera position and field of view of the camera, the relative camera position being obtained from a current attitude of the maritime vessel determined by a three-direction attitude sensor, and the field of view of the camera being determined from the relative camera position and aligned with a virtual field of view of a virtual marine environment;
    an object generator configured to generate an object indicator at a position on the projected image based on the object location and the location information;
    a selected point receiver configured to receive a user input selecting a point of the plurality of points on the projected image;
    a location retriever configured to retrieve a location associated with the selected point;
    a calculator configured to calculate a distance to the location of the selected point from a location of the camera based on a horizon at sea or a Depth Elevation Model on land; and
    a display configured to display the projected image, the object indicator at the position on the projected image, the location of the selected point, and a distance indicator indicating the distance, the object indicator being an icon with a shape and/or a color that is based on an identification of the object.

2. The marine environment display device of claim 1, wherein the image generator comprises:
    a chart engine program configured to provide, from chart data, the virtual marine environment corresponding to the relative camera position and field of view of the camera, wherein each of a plurality of points on the virtual marine environment is associated with the location information and corresponds to a respective point of the plurality of points on the projected image; wherein
    the image generator generates the projected image by projecting the image onto the virtual marine environment; and
    the object generator generates the object indicator at the position on the projected image based on the object location and each of the plurality of points on the virtual marine environment.

3. The marine environment display device of claim 2, wherein:
    the camera is a remote controlled camera on board the maritime vessel; and
    the relative camera position is at least partially based on a feedback signal from the camera indicating a current position of the camera.

4. The marine environment display device of claim 1, wherein the object location is received from at least one of chart data, Automatic Identification System (AIS), Automatic Radar Plotting Aid (ARPA), and Digital Selective Calling (DSC).

5. The marine environment display device of claim 1, further comprising:
    an identification receiver configured to receive the identification of the object, wherein:
    the object is a fixed object; and
    the object location is received from chart data.

6. The marine environment display device of claim 1, further comprising:
    an identification receiver configured to receive the identification of the object, wherein:
    the object is a moving object; and
    the object location is received from at least one of Automatic Identification System (AIS), Automatic Radar Plotting Aid (ARPA), and Digital Selective Calling (DSC).

7. The marine environment display device of claim 6, wherein:
    the object indicator is a text label; and
    the object generator is further configured to reposition the text label to avoid overlapping a second text label of a second object indicator.

8. The marine environment display device of claim 1, further comprising:
    an operation performer configured to perform a zoom operation and/or a pan operation centered on the selected point.

9. The marine environment display device of claim 1, wherein the camera comprises one or more of a gyroscope, an accelerometer, and/or a GPS receiver, the gyroscope, the accelerometer, and/or the GPS receiver used to derive a current position of the camera, and
    wherein the relative camera position is obtained further based on a feedback signal from the camera indicating the current position.

10. The marine environment display device of claim 1, wherein the relative camera position is obtained further based on an altitude difference between the camera and the marine environment display device, the altitude difference being inputted by an operator.

11. The marine environment display device of claim 1, wherein the distance indicator points to a value on a vertical scale, and wherein the location of the selected point is displayed by a bearing indicator pointing to a value on a horizontal scale.

12. A method implemented in a marine environment display device for georeferencing an image stream of a marine environment captured by a camera on board a maritime vessel, the method comprising:

receiving an image of the image stream from the camera;

receiving an object location of an object;

generating, from the image, a projected image having location information associated with each of a plurality of points on the projected image and corresponding to a relative camera position and field of view of the camera, the relative camera position being obtained from a current attitude of the maritime vessel determined by a three-direction attitude sensor, and the field of view of the camera being determined from the relative camera position and aligned with a virtual field of view of a virtual marine environment;

generating an object indicator at a position on the projected image based on the object location and the location information;

receiving a user input selecting a point of the plurality of points on the projected image;

retrieving a location associated with the selected point;

calculating a distance to the location of the selected point from a location of the camera based on a horizon at sea or a Depth Elevation Model on land; and displaying the projected image, the object indicator at the position on the projected image, the location of the selected point, and a distance indicator indicating the distance on a display, the object indicator being an icon with a shape and/or a color that is based on an identification of the object.

13. The method of claim 12, the method further comprising:

providing, from chart data, the virtual marine environment corresponding to the camera position and field of view of the camera, wherein each of a plurality of points on the virtual marine environment is associated with the location information and corresponds to a respective point of the plurality of points on the projected image; and projecting the image onto the virtual marine environment;

wherein the object indicator is generated at the position on the projected image based further on each of the plurality of points on the virtual marine environment.

14. The method of claim 12, wherein the object location is received from at least one of chart data, Automatic Identification System (AIS), Automatic Radar Plotting Aid (ARPA), and Digital Selective Calling (DSC).

15. The method of claim 12, wherein:

the object is a moving object; and the object location is received from at least one of Automatic Identification System (AIS), Automatic Radar Plotting Aid (ARPA), and Digital Selective Calling (DSC);

the method further comprising receiving the identification of the object.

16. The method of claim 15, wherein the object indicator is a text label, the method further comprising repositioning the text label to avoid overlapping a second text label of a second object indicator.

17. The method of claim 12, further comprising performing a zoom operation and/or a pan operation centered on the selected point.

18. A marine environment display device for georeferencing an image stream of a marine environment captured by a camera on board a maritime vessel, the marine environment display device comprising:

an image receiver configured to receive an image of the image stream from the camera;

a location receiver configured to receive an object location of an object;

a chart engine program configured to provide, from chart data, a virtual marine environment corresponding to a relative camera position and field of view of the camera;

an image generator configured to generate, by projecting the image onto the virtual marine environment, a projected image having location information associated with each of a plurality of points on the projected image and corresponding to the relative camera position and field of view of the camera, wherein each of a plurality of points on the virtual marine environment is associated with the location information and corresponds to a respective point of the plurality of points on the projected image, the relative camera position being obtained from a current attitude of the maritime vessel determined by a three-direction attitude sensor, and the field of view of the camera being determined from the relative camera position and aligned with a virtual field of view of the virtual marine environment;

an object generator configured to generate an object indicator at a position on the projected image based on the object location, the location information, and each of the plurality of points on the virtual marine environment;

a selected point receiver configured to receive a user input selecting a point of the plurality of points on the projected image;

a location retriever configured to retrieve a location associated with the selected point;

a calculator configured to calculate a distance to the location of the selected point from a location of the camera based on a horizon at sea or a Depth Elevation Model on land; and a display configured to display the projected image, the object indicator at the position on the projected image, the location of the selected point, and a distance indicator indicating the distance, the object indicator being an icon with a shape and/or a color that is based on an identification of the object.

* * * * *